Aug. 16, 1932.  R. SCHWABE  1,871,807
SKETCHING CAMERA
Filed Feb. 2, 1932
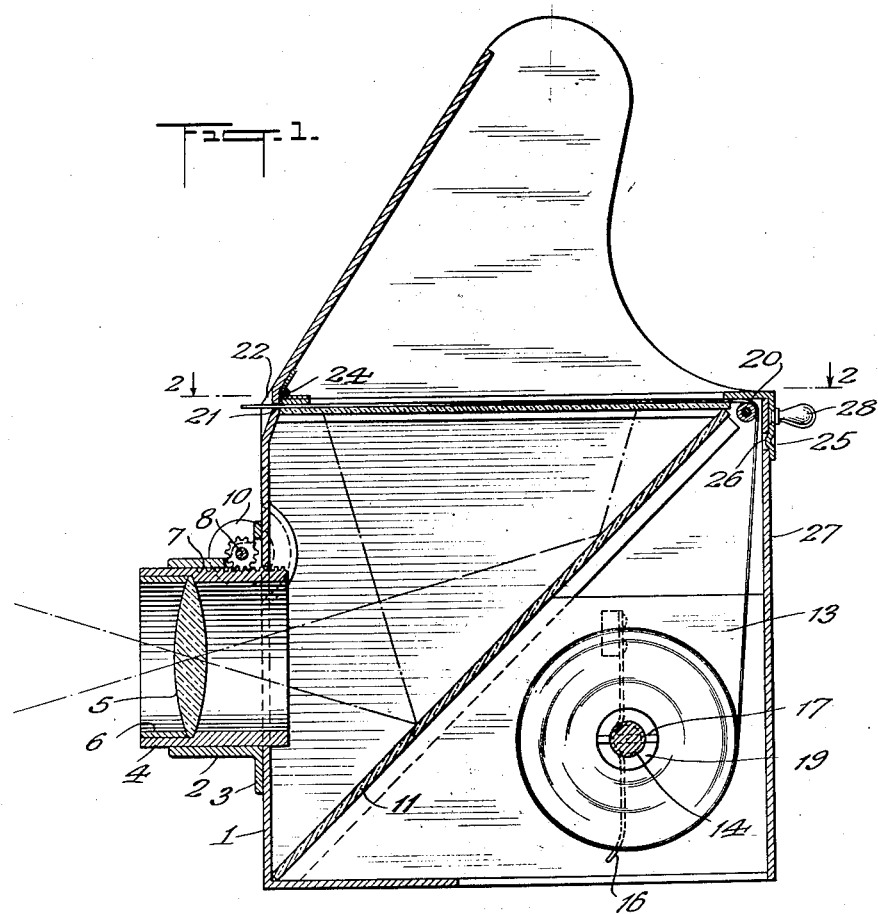
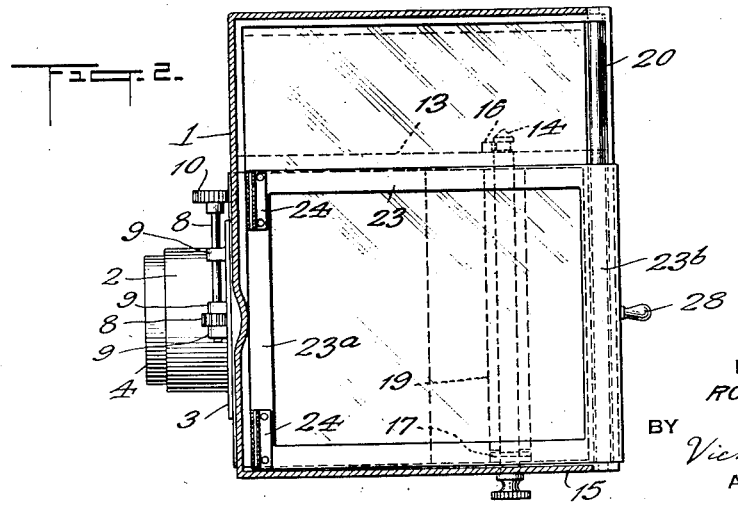
INVENTOR
ROLF SCHWABE.
BY Victor D. Borst
ATTORNEYS Patented Aug. 16, 1932

1,871,807

UNITED STATES PATENT OFFICE

ROLF SCHWABE, OF BATAVIA, NEW YORK

SKETCHING CAMERA

Application filed February 2, 1932. Serial No. 590,337.

My invention relates to cameras in which the image of an external object is reproduced on a visible surface for the purpose of tracing the lines of the image of the object.

Sketching cameras of this type have long been known and used and have been produced in various forms. Some such cameras require a darkened chamber for the person making the sketch into which only the light rays reflected from the object to be traced are admitted. These light rays are reflected on to the surface on which it is desired to trace the image of the object coming within the field of the lens of the camera. Other such cameras have been produced in a more readily portable form. These latter sketching cameras usually are not entirely self-contained and are provided with a ground glass on to which the light rays entering the camera are focused. When the image has been properly focused upon the ground glass, a sheet of tracing paper is placed thereover and the image may be traced upon the paper.

An advantage of my invention is the fact that it is a self-contained unit and the image of the object within the field of the lens of the camera is reproduced upon the sketching paper directly. In accordance with my invention, the tracing paper is contained within the camera in the form of a roll somewhat similar to a film in an ordinary camera. The rays of light passing through the lens of the camera are reflected transversely to a normally horizontal, transparent plane, over which the tracing paper passes and against which the tracing paper may be firmly secured. The image of the object or objects in line with the camera are thus produced directly upon the tracing paper. After a sketch of an object has been completed, that portion of the paper on which the image was traced may be withdrawn from the camera and severed from the rest, a new portion of the paper coming into position as the part used is withdrawn.

Specifically, the camera of my invention comprises a box in the forward side of which there is mounted an adjustable lens for collecting and focusing the light rays reflected from the object, the image of which it is desired to sketch. Behind this lens there is mounted a reflecting surface, such as a mirror, at an angle of approximately 45°. The light rays passing through the lens of the camera strike this reflecting surface and are reflected towards the top or cover of the box. The cover of the box is made of transparent material such as plate glass so that the light rays may pass therethrough and it acts as a support upon which the sketching may be done. Behind the mirror within the box, there is provided a transverse shaft on which is removably mounted a roll of sketching paper. Adjacent the cover of the camera there is a transverse guide roller over which the sketching paper passes from the roll to the upper surface of the cover of the camera box. The paper is then drawn along the upper surface of the cover and passes through a slot formed in the forward side of the camera box which side, together with the two adjacent sides of the camera box, is extended well above the cover, the three extensions forming a light shield which absorbs light passing directed from outside of the camera towards the cover thereof. To the forward side of the camera box immediately above the slot therethrough for the sketching paper, there is pivotally secured a frame which extends transversely of the box and is provided with a catch that engages the rear side of the camera box. This frame member lies flat against the cover of the camera and when a portion of the sketching paper is on the cover, the frame member presses the paper in contact with the cover of the camera and prevents the paper from slipping while the image formed thereon is being traced. The sketching paper is such that the image of the object to be sketched is reproduced on the paper, the light rays passing directly through the transparent cover of the camera box.

A more detailed description of the sketching camera of my invention will now be given in connection with the embodiment illustrated in the drawing and the invention will be thereafter pointed out in claims.

In the drawing:

Fig. 1 is a sectional elevation of a sketching camera constructed in accordance with my invention; and Fig. 2 is a sectional plan of the same taken on the line 2—2 of Fig. 1.

The sketching camera illustrated in the drawing consists of a box, the side walls of which may be blackened to absorb all light falling thereon. Through the forward side 1 of this box there is an opening through which light rays reflected from an object may pass into the box. A cylindrical frame or bushing 2 is secured to the outer surface of the forward side of the camera box in alignment with the opening therethrough. This cylindrical frame member is provided with a circumferential flange 3 that abuts against the side of the camera box and is secured thereto. Within the cylindrical frame member there is slidably mounted a tube 4 in which a lens 5 is mounted. Adjacent the outer end of the tube, the tube is increased in diameter so as to form a shoulder therein against which the outer edge of the lens abuts. A sleeve 6 fitting within the outer end of the tube abuts against the opposite side of the lens and secures the lens in place within the tube. For focusing the lens, there is provided on the tubular member in which it is mounted, a rack 7 that engages a pinion secured to a transverse shaft 8, the cylindrical frame member being grooved to admit the pinion. The shaft carrying the pinion is rotatably mounted in brackets 9 that are formed on the circumferential flange 3 of the cylindrical frame member 2, and at the end opposite to that on which the pinion is mounted, there is secured on the shaft a knurled wheel 10 by means of which the shaft may be manually rotated to slide the lens carrying tube relative to the cylindrical frame member.

Within the camera box, there is mounted a reflecting plate or mirror 11. This mirror is mounted at an angle of approximately 45° and the reflecting surface faces the forward side of the camera box. As shown by the broken lines, light rays which are collected and focused by the lens are reflected by the mirror towards the top or cover 12 of the camera box. This top of the camera box is made of plate glass so that the light rays reflected thereon may pass therethrough. The interior of the box is divided into two sections by a partition 13 and the mirror is mounted within the lower section as seen in Fig. 2. The other section is merely provided for the purpose of giving additional room for the hand of the operator when engaged in sketching.

Behind the mirror there is mounted a transverse shaft 14 parallel to the plane of the mirror, which shaft extends through one side wall 15 and the partition wall 13, the shaft being journaled in the side wall and the partition. The end of the shaft 14 extending through the partition is reduced in diameter and engages a curved section of a leaf spring 16 which is secured to the partition and which acts as a brake upon the shaft and also holds the shaft against longitudinal movement. On this shaft is mounted a roll of sketching paper 17. The shaft is provided with a pin 18 that extends through the shaft transversely thereof and which engages notches in the end of the core 19 on which the sketching paper is rolled. In this way, the shaft is caused to turn with the sketching paper and the leaf spring acts as a brake to prevent accidental unwinding of the roll. To replace a roll of sketching paper, the leaf spring is moved out of the groove in the shaft, and the shaft is withdrawn. An opening is provided through the bottom of the camera for removing the core remaining on the shaft and replacing it with a new roll of paper.

The rear end of the cover of the camera is provided with a groove extending from the side wall to the partition and in this groove there is mounted a guide roller 20 over which the paper passes and which guides the paper to the upper surface of the cover of the camera box. Through the forward side of the camera box, in the plane of the upper surface of the cover there is formed a slot 21 through which the sketching paper is adapted to pass. At the center of this slot there is provided finger depressions 22 in which the fingers may be placed for grasping the end of the sketching paper to withdraw a portion of the sketching paper which has been used, and also to bring a clean portion of the sketching paper on to the cover of the camera. It will be apparent that the light rays reflected from the mirror will pass through the cover of the camera on to the sketching paper and the image of the object from which the light rays are reflected to the camera will be reproduced on the sketching paper.

In order that a distinct image be produced upon the sketching paper which lies on the cover of the camera it is necessary to exclude, as far as possible, all extraneous light from the sketching paper. For this purpose the forward side of the camera and the two adjacent sides are extended considerably above the top of the camera box. The extension of the forward side is inclined towards the rear of the camera and one of the side extensions is cut away as shown in Fig. 1, to provide room for the hand of the operator. These extensions however serve to exclude light from the upper surface of the cover, or the sketching paper, and produce in effect a dark background for the light rays forming the image on the sketching paper.

In order that a clear and sharp image be produced upon the sketching paper, it is also necessary that the sketching paper be maintained in tight contact with the surface of the transparent cover and for this purpose there is provided a frame 23 which clamps the paper to the cover. This frame is large enough to embrace the entire field of the lens, extending from the partition 13 to the side wall and from the forward to the rear end of the camera box. The forward transverse member 23a of the frame is secured to the inclined extension of the forward side of the camera box by means of a pair of hinges 24 so that the frame is pivotally mounted in the forward extension adjacent the upper surface of the cover of the camera box. The rear transverse member 23b of the frame has formed thereon a lateral flange 25 having an indentation 26 that engages a recess in the rear side 27 of the camera box to maintain the frame member in contact with the cover of the camera. This flange is also provided with a handle 28 by means of which the frame member may be moved about the pivotal connection to the extension of the forward side. When a sketch has been made, the frame member is raised about its pivotal connection to the camera box and the tracing paper is withdrawn through the slot in the forward side wall until the portion on which the sketch was made extends outside of the camera box. The frame is then moved towards the cover of the camera and pressed downwardly until latched. In this position it firmly clamps the tracing paper against the cover. The edge of the inclined extension of the forward side of the camera box may be sharpened or serrated so that the tracing paper may be severed when withdrawn from the box.

It is obvious that various changes may be made by those skilled in the art in the details of the embodiment illustrated in the drawing and above particularly described within the scope of my invention as expressed in the appended claims.

I claim:

1. A sketching camera comprising a box having an opening in one side thereof, a transparent cover for said box, a lens mounted in alignment with the opening in the side of the box, a mirror positioned within the box to receive the light rays passing through the lens and reflect them on to the transparent cover, a shaft within the box adapted to rotatably support a roll of sketching paper, a guide for directing paper from a roll on the shaft along the surface of the cover, and means for securing the paper to the surface of the cover.

2. A sketching camera comprising a box having a circular opening in the forward side thereof, a transparent cover for said box, the side of the box having the opening therethrough and the contiguous sides extending above the cover of the box to form a light shield therefor, a lens mounted in alignment with the opening in the box and movable axially thereof, a mirror positioned within the box to receive light rays passing through the lens and reflect the light rays on to the transparent cover, a shaft within the box for rotatably supporting a roll of sketching paper, a guide for directing the sketching paper from the roll over the upper surface of the transparent cover, the front wall of the box having a slot therein in the plane of the cover for the sketching paper, and a frame for securing the sketching paper in contact with the surface of the cover.

3. A sketching camera comprising a box having a circular opening in the forward side thereof, a transparent cover for said box, extensions on the forward side and the sides adjacent thereto above the cover of the box to form a light shield therefor, the extension on the forward side having a slot therethrough in the plane of the surface of the cover, a lens mounted in alignment with the circular opening in the forward side of the box and movable axially thereof, a mirror positioned within the box to receive light rays passing through the lens and reflect the light rays on to the transparent cover, a shaft within the box mounted parallel to the forward side thereof and adapted to support a roll of sketching paper, a guide mounted adjacent the rear end of the cover for guiding sketching paper from a roll mounted on the shaft to the upper surface of the transparent cover, the paper passing through the slot in the extension of the forward side of the box, and a pivotally mounted frame for engaging the edges of sketching paper and securing them in contact with the surface of the transparent cover.

4. A sketching camera comprising a box having a circular opening in the forward side thereof, a transparent cover for said box, extensions on the forward side and the sides adjacent thereto above the cover of the box to form a light shield therefor, the extension on the forward side having a slot therethrough in the plane of the surface of the cover, a lens mounted in alignment with the circular opening in the forward side of the box and movable axially thereof, a mirror positioned within the box to receive light rays passing through the lens and reflect the light rays on to the transparent cover, a shaft within the box mounted parallel to the forward side thereof and adapted to support a roll of sketching paper, a guide mounted adjacent the rear end of the cover for guiding sketching paper from a roll mounted on the shaft to the upper surface of the transparent cover, the paper passing through the slot in the extension of the forward side of the box, a pivotally mounted frame for engaging the edges of sketching paper and securing them in contact with the surface of the transparent cover, and means for securing the frame in position against the cover of the box.

5. A sketching camera comprising a box having a circular opening in the forward side thereof, a transparent cover for said box, extensions on the forward side and the sides adjacent thereto above the cover of the box to form a light shield therefor, the extension on the forward side having a slot therethrough in the plane of the surface of the cover, a lens mounted in alignment with the circular opening in the forward side of the box and movable axially thereof, a mirror positioned within the box to receive light rays passing through the lens and reflected light rays on to the transparent cover, a shaft within the box mounted parallel to the forward side thereof and adapted to support a roll of sketching paper, a guide mounted adjacent the rear end of the cover for guiding sketching paper from a roll mounted on the shaft to the upper surface of the transparent cover, the paper passing through the slot in the extension of the forward side of the box, a frame member pivotally secured to the extension on the forward side of the box for engaging the edges of sketching paper and securing them in contact with the surface of the transparent cover, and a catch for securing the frame in position against the cover of the box.

In witness whereof, I hereunto subscribe my signature.

ROLF SCHWABE.